(12) United States Patent
Nishikawa

(10) Patent No.: US 6,816,192 B1
(45) Date of Patent: Nov. 9, 2004

(54) MOTION PICTURES SENDING APPARATUS AND MOTION PICTURES COMMUNICATION APPARATUS

(75) Inventor: Tsuyoshi Nishikawa, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 831 days.

(21) Appl. No.: 09/663,198

(22) Filed: Sep. 18, 2000

(30) Foreign Application Priority Data

Sep. 20, 1999 (JP) .......................................... 11-266130

(51) Int. Cl.[7] .......................... H04N 5/76; H04N 7/14; H04N 5/225; G06F 3/00

(52) U.S. Cl. .............................. 348/231.99; 348/14.14; 348/207.1; 710/53

(58) Field of Search .......................... 348/208.1, 208.2, 348/208.3, 208.99, 208.16, 14.12, 14.14, 14.13, 14.15, 207.1, 207.11, 222.1, 231.99, 231.2, 552; 710/53

(56) References Cited

U.S. PATENT DOCUMENTS

| | | | | |
|---|---|---|---|---|
| 5,164,824 A | * | 11/1992 | Ieoka et al. ............. | 348/231.99 |
| 5,229,850 A | * | 7/1993 | Toyoshima ................. | 348/153 |
| 5,235,427 A | * | 8/1993 | Kim ....................... | 348/208.16 |
| 5,317,399 A | * | 5/1994 | Satake et al. ............. | 348/571 |
| 5,929,900 A | * | 7/1999 | Yamanaka et al. ......... | 348/220.1 |
| 6,044,416 A | * | 3/2000 | Hasan ....................... | 710/52 |
| 6,069,639 A | * | 5/2000 | Takasugi ..................... | 345/534 |
| 6,108,027 A | * | 8/2000 | Andrews et al. ......... | 348/14.14 |
| 6,151,068 A | * | 11/2000 | Ikeda ..................... | 348/208.99 |
| 6,169,574 B1 | * | 1/2001 | Noguchi et al. ....... | 348/231.99 |
| 2001/0024473 A1 | * | 9/2001 | Nakaya et al. .............. | 348/699 |

FOREIGN PATENT DOCUMENTS

| | | | | |
|---|---|---|---|---|
| EP | 0 862 332 | | 9/1998 | |
| JP | 08102939 A | * | 4/1996 | ............ H04N/7/24 |
| JP | 8-205149 | | 8/1996 | |
| JP | 10-248063 | | 9/1998 | |
| JP | 11-308585 | | 11/1999 | |
| WO | WO 96/19073 | | 6/1996 | |

* cited by examiner

Primary Examiner—Ngoc-Yen Vu
Assistant Examiner—John M Villecco
(74) Attorney, Agent, or Firm—Oblon, Spivak, McClelland, Maier & Neustadt, P.C.

(57) ABSTRACT

A motion pictures sending apparatus has a camera interface for receiving an image signal from a camera, a frame conversion unit for carrying out coordinates conversion on the received image signal and generating image data, a memory for storing the image data, an image processing unit for processing the image data from the memory and providing processed data, an output interface for transferring the processed data to a communication interface unit, and a memory control unit for stopping the updating of image data to the memory in response to an input signal. When required, the apparatus keeps the same image in the memory and continuously sends the image so that the quality and clarity of the sent image may gradually improve.

17 Claims, 10 Drawing Sheets

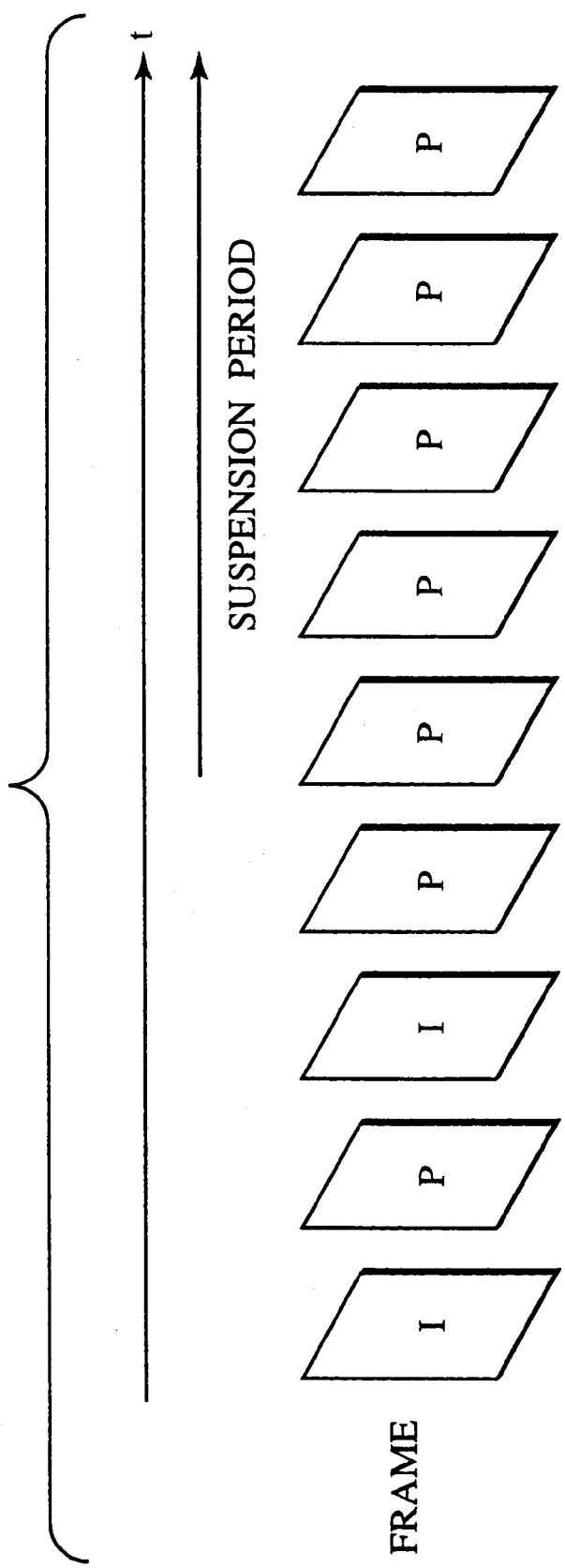

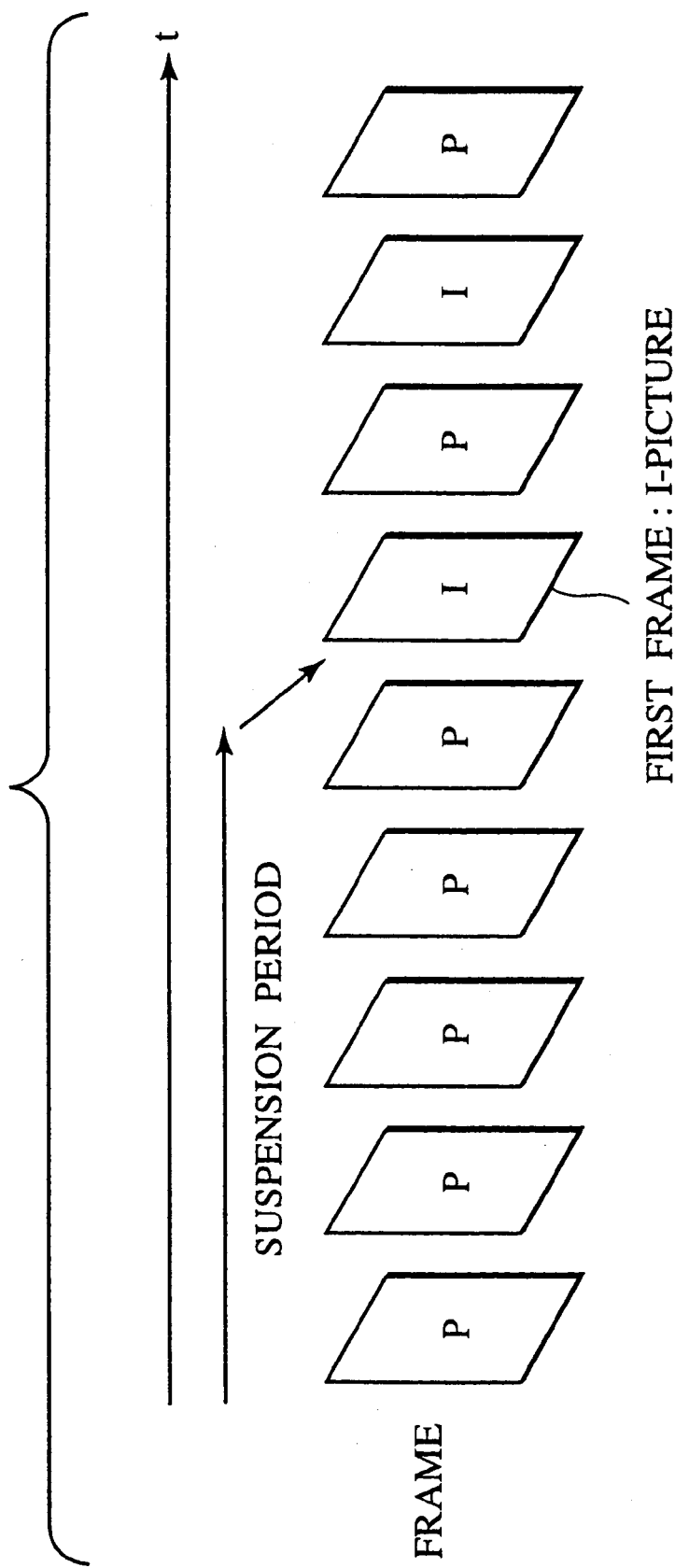

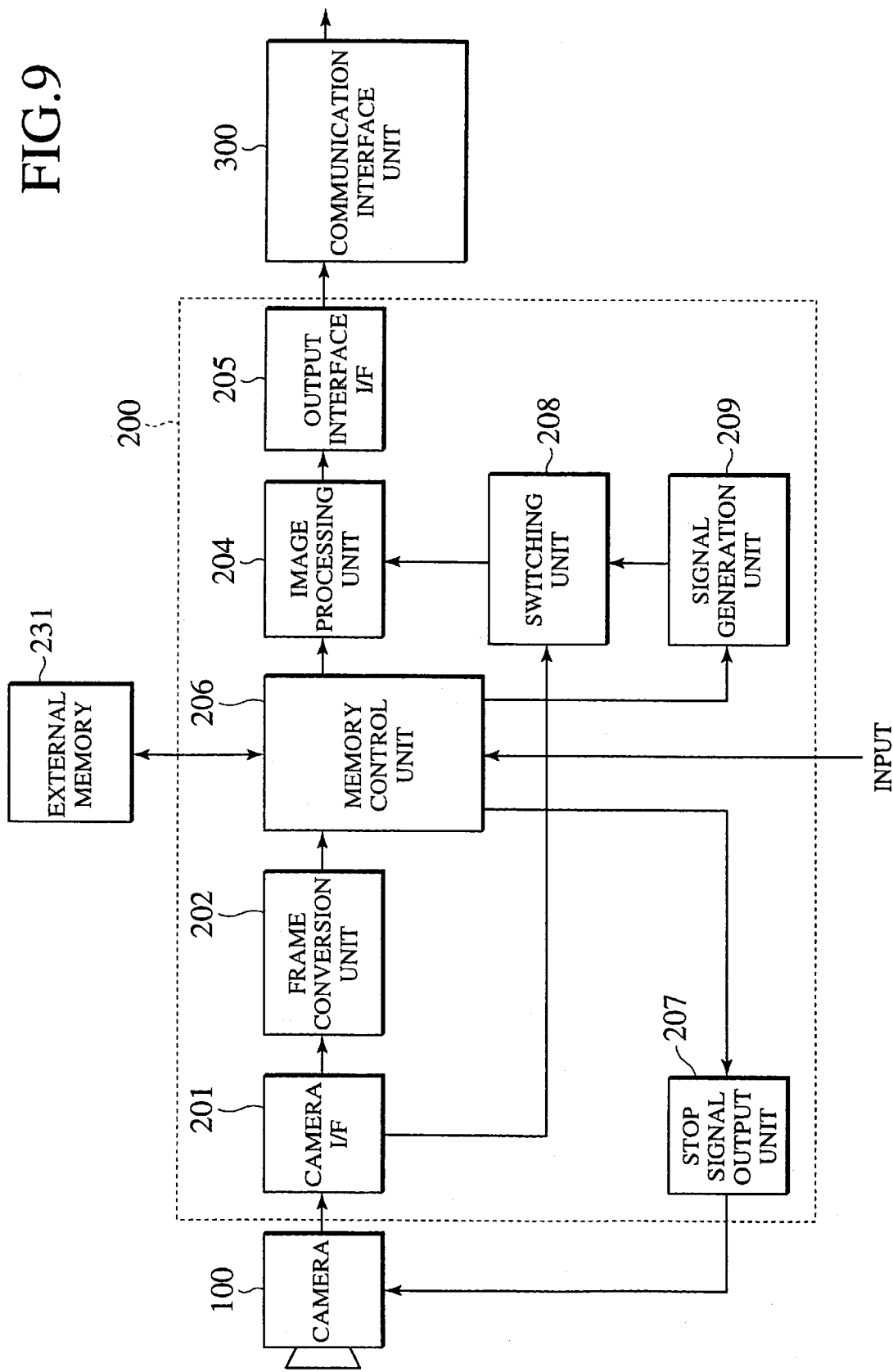

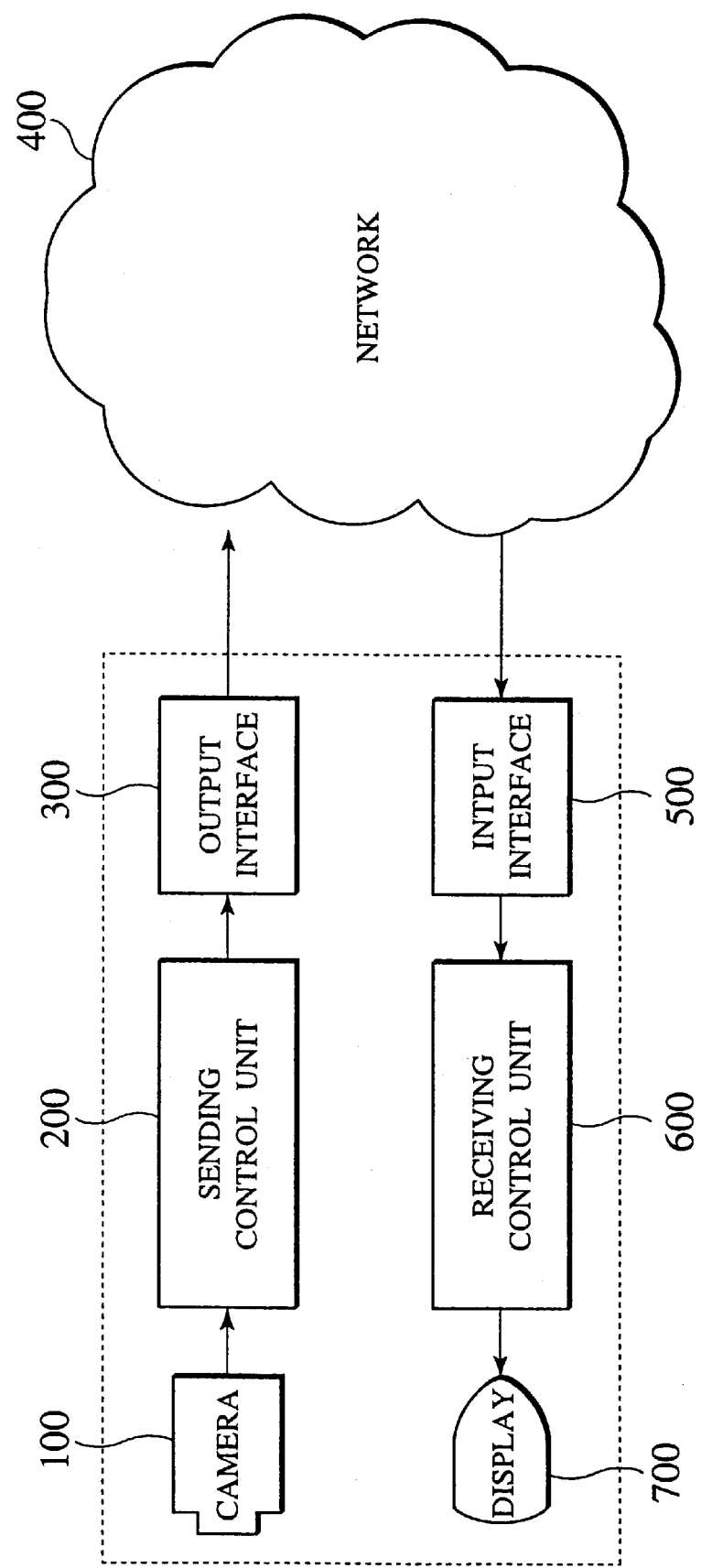

MOTION PICTURES SENDING APPARATUS AND MOTION PICTURES COMMUNICATION APPARATUS

CROSS REFERENCE TO RELATED APPLICATIONS

This application claims benefit of priority under 35 USC 119 based on Japanese patent application PH11-266130 filed Sep. 20, 1999, the entire contents of which are incorporated by reference herein.

BACKGROUND OF THE INVENTION

1. Field of the Invention

The present invention relates to apparatuses for sending and communicating motion pictures, and particularly, to a technique of sending clear motion pictures with a simple arrangement.

2. Description of Related Art

When communicating motion pictures with a third party, a prior art compresses and decompresses the images so that the images may be sent in a relatively narrow band. In addition to the compression and decompression, the prior art carries out rate control to send a given number of motion pictures within a given band. This rate control deteriorates image quality.

Since the sending rate of images is limited, the prior art may send clear images with a drastically reduced number of frames, or motion pictures of low quality.

There is a need of sending specific images clearly. To meet this need, another prior art provides a switch for a motion pictures communication apparatus. The switch is pushed to interrupt original rate control and start an exceptional operation to send a specific still image. This technique, however, is far from seamless operability. In addition, the exceptional operation requires additional hardware and software and suddenly drops a frame rate.

In this way, the prior arts can only send, within a limited communication rate, clear images with a drastically reduced number of frames, or rough images with a usual number of frames. To carry out the exceptional operation for sending clear images, the prior arts need additional hardware and software. Such additional hardware and software are unacceptable for data communication terminals that should be compact.

SUMMARY OF THE INVENTION

The present invention is to provide apparatuses of simple arrangements for sending and communicating clear motion pictures.

An aspect of the present invention provides a motion pictures sending apparatus having a camera interface for receiving an image signal from a camera, a frame conversion unit for carrying out coordinates conversion on the received image signal and generating image data, a memory for storing the image data, an image processing unit for processing the image data from the memory and providing processed data, an output interface for transferring the processed data to a communication interface unit, and a memory control unit for stopping the updating of image data to the memory in response to an input signal.

The apparatus also has a controller for allowing a user to fix an image in the memory. The apparatus is capable of sending clear images and is simple with minimum hardware and software.

BRIEF DESCRIPTION OF THE DRAWINGS

The objects, features, and advantages of the present invention will become more apparent from the following description of the preferred embodiments taken in conjunction with the accompanying drawings, in which:

FIG. 7 shows the operation of a sixth embodiment of the present invention;

FIG. 8 shows the operation of a seventh embodiment of the present invention;

FIG. 9 shows a motion pictures sending apparatus according to an eighth embodiment of the present invention; and FIG. 10 shows a motion pictures communication apparatus according to a ninth embodiment of the present invention.

DESCRIPTION OF THE PREFERRED EMBODIMENTS

Figure 1:
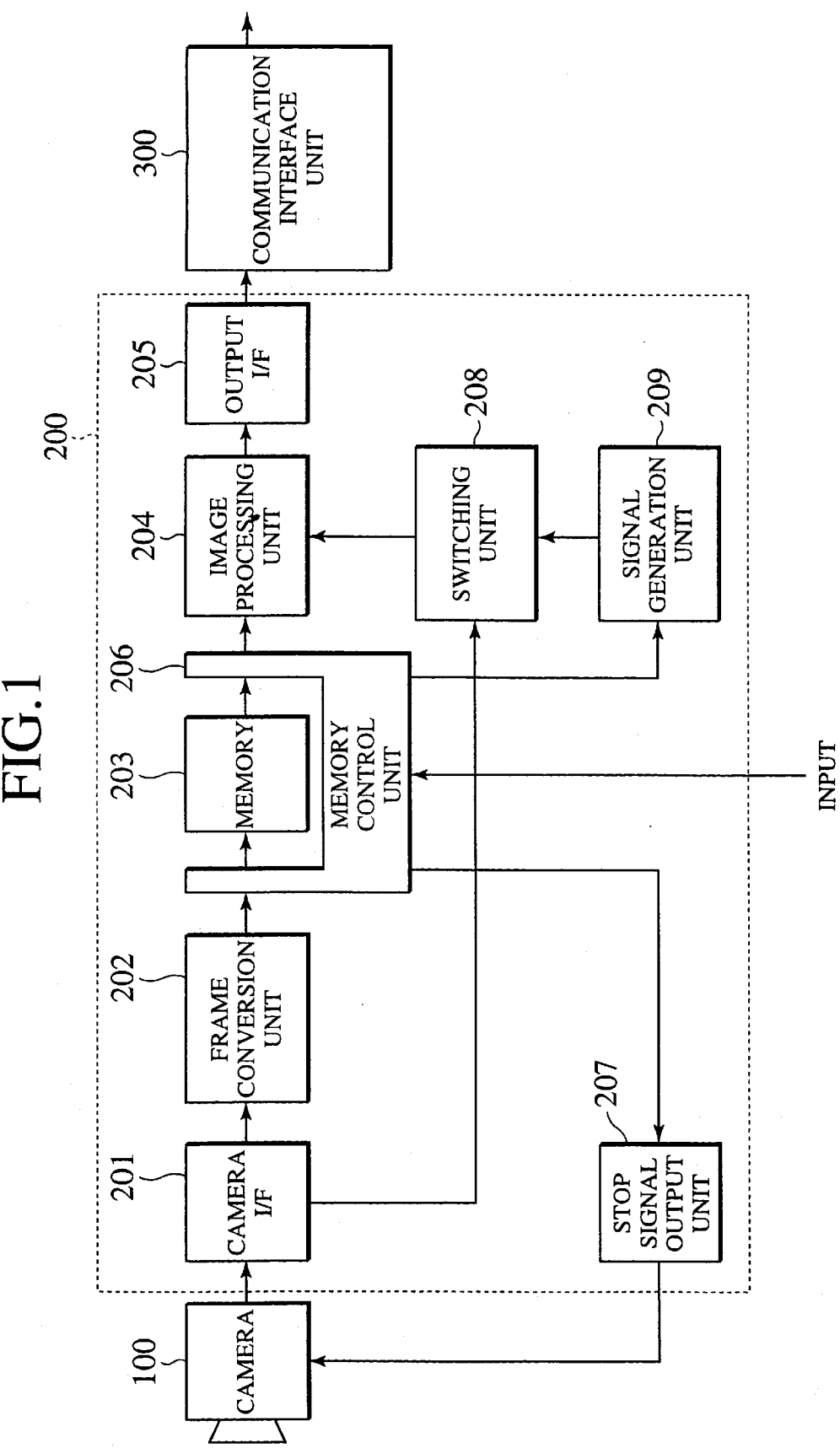
FIG. 1 shows a motion pictures sending apparatus according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

FIG. 1 shows a motion pictures sending apparatus according to the first embodiment of the present invention. A camera interface 201 receives an image signal from a camera 100. A frame conversion unit 202 carries out coordinates conversion on the image signal and generates image data. A memory 203 stores the image data. An image processing unit 204 processes the image data from the memory 203 and provides processed data. An output interface 205 transfers the processed data to a communication interface unit 300. A memory control unit 206 stops the updating of image data to the memory 203 in response to an input signal.

The camera 100 has, for example, CCDs (charge coupled devices) or CMOS sensors to pick up motion pictures and generate an image signal according to the picked-up motion pictures. The image signal may include an actual image signal (for example, a YCbCr signal), a vertical synchronizing signal, a horizontal synchronizing signal, and a clock signal.

The camera interface 201 receives the image signal from the camera 100.

The frame conversion unit 202 receives the image signal from the camera interface 201, carries out coordinates conversion on the image signal, and provides image data. The coordinates conversion converts the coordinate system of the image signal into another. In this embodiment, the frame conversion unit 202 converts an image signal based on a coordinate system of the camera 100 into image data based on a coordinate system of the memory 203.

The memory 203 stores the image data and provides the stored image data according to given conditions.

The image processing unit 204 reads the image data from the memory 203 and operates the read image data. For example, the image processing unit 204 compresses the image data according to, for example, ITU Recommendation H.263 or MPEG 4, so that the image data may be sent in a relatively narrow band.

The output interface 205 receives the processed data from the image processing unit 204 and transfers it to the communication interface unit 300. The compressed data are based on the MPEG standard, H.263 standard and so on, which is applied forward prediction. Such standards decode an original image to prepare a reference image, carries out motion compensation on the reference image to prepare a motion-compensated image, expresses the motion-compensated image with the difference from the reference image, compresses the difference into codes, and sends the codes.

The communication interface unit 300 is connected to an external network, to send the processed data. The communication interface unit 300 may be a modem, a terminal adapter, or any other suitable device.

The memory control unit 206 controls inputs and outputs to and from the memory 203 in response to an input signal. The input signal to the memory control unit 206 is externally given by, for example, an operator of the motion pictures sending apparatus. The apparatus may have a switch an operator may push to issue an input signal to the memory control unit 206. Upon receiving the input signal, the memory control unit 206 continuously transfers the same image data from the memory 203 to the image processing unit 204. As a result, the image processing unit 204 processes and sends the same image, thereby gradually improving the quality of the image.

As explained above, the image processing unit 204 decodes an original image to prepare a reference image, carries out motion compensation on the reference image to prepare a motion-compensated image, expresses the motion-compensated image with the difference from the reference image, compresses the difference into codes, and sends the codes. Accordingly, continuously sending the same image may gradually improve the quality of the image. A given image stored in the memory 203 is continuously transferred and processed to provide still images that gradually become clearer.

When an operator wants to send a specific still image with improved quality, the operator may push the switch provided for the apparatus to instruct the memory control unit 206 to carry out the same image improving process mentioned above. Only while the switch is being pushed, an image presently being transferred from the memory 203 to the image processing unit 204 may continuously be transferred.

The arrangement of this embodiment is simple to send clear still images without exceptional rate control. The embodiment minimizes hardware including memories and circuits and software including programs.

Second Embodiment

Figure 2:
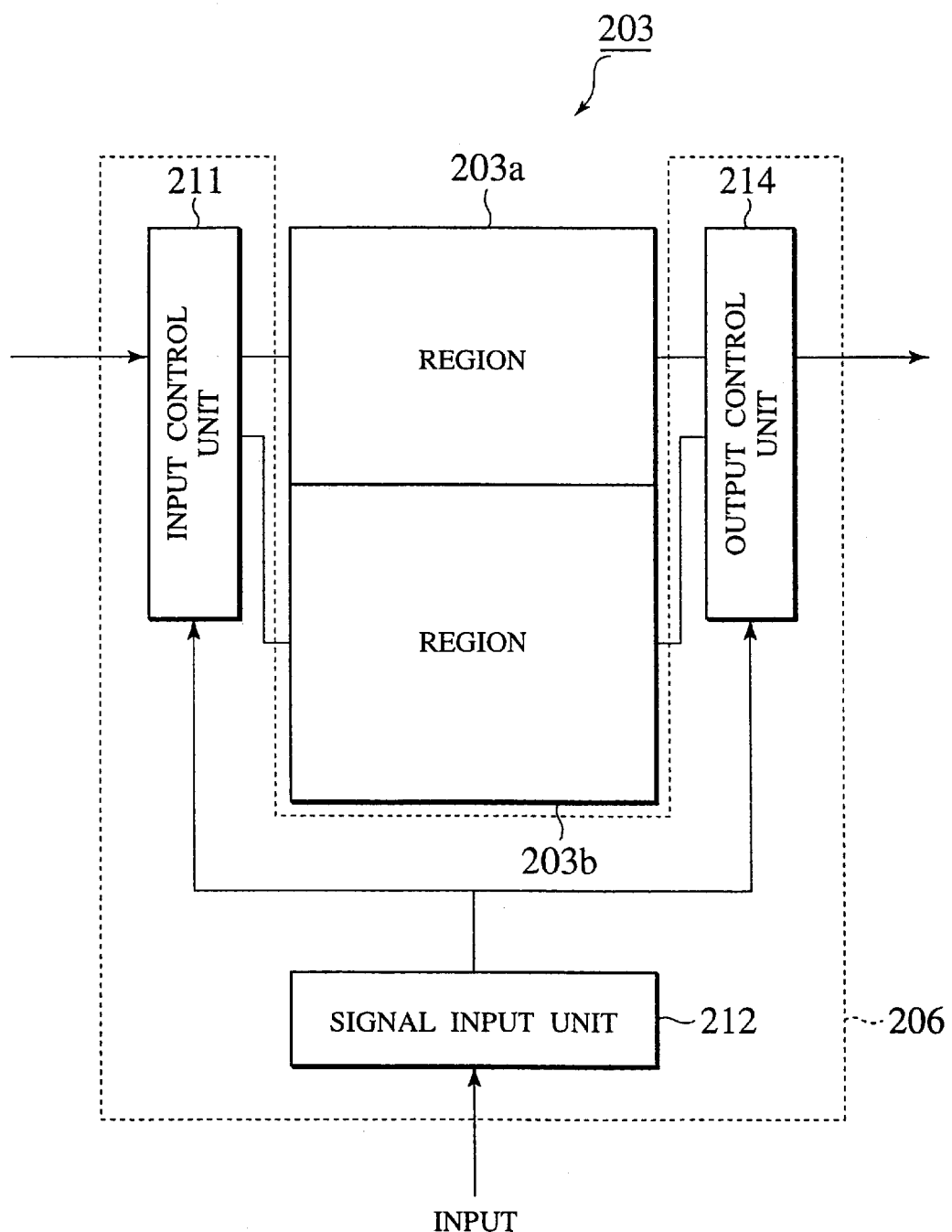
FIG. 2 shows a memory and memory control unit according to a second embodiment of the present invention.

FIG. 2 shows a memory 203 and a memory control unit 206 according to the second embodiment of the present invention, applied to the motion pictures sending apparatus of FIG. 1. The memory 203 has a plurality (two in this embodiment) of memory regions to store image data. One of the memory regions 203a and 203b receives input data while the other provides output data. The memory control unit 206 consists of an input control unit 211, a signal input unit 212, and an output control unit 214. The signal input unit 212 provides a memory control signal in response to an external input signal. The input control unit 211 receives image data from the frame conversion unit 202 (not shown) and writes, i.e., stores the image data into one of the memory regions 203a and 203b according to a memory control signal from the signal input unit 212. The output control unit 214 reads image data from one of the memory regions 203a and 203b according to the memory control signal from the signal input unit 212 and sends the read image data to the image processing unit 204 (not shown).

Figure 3:
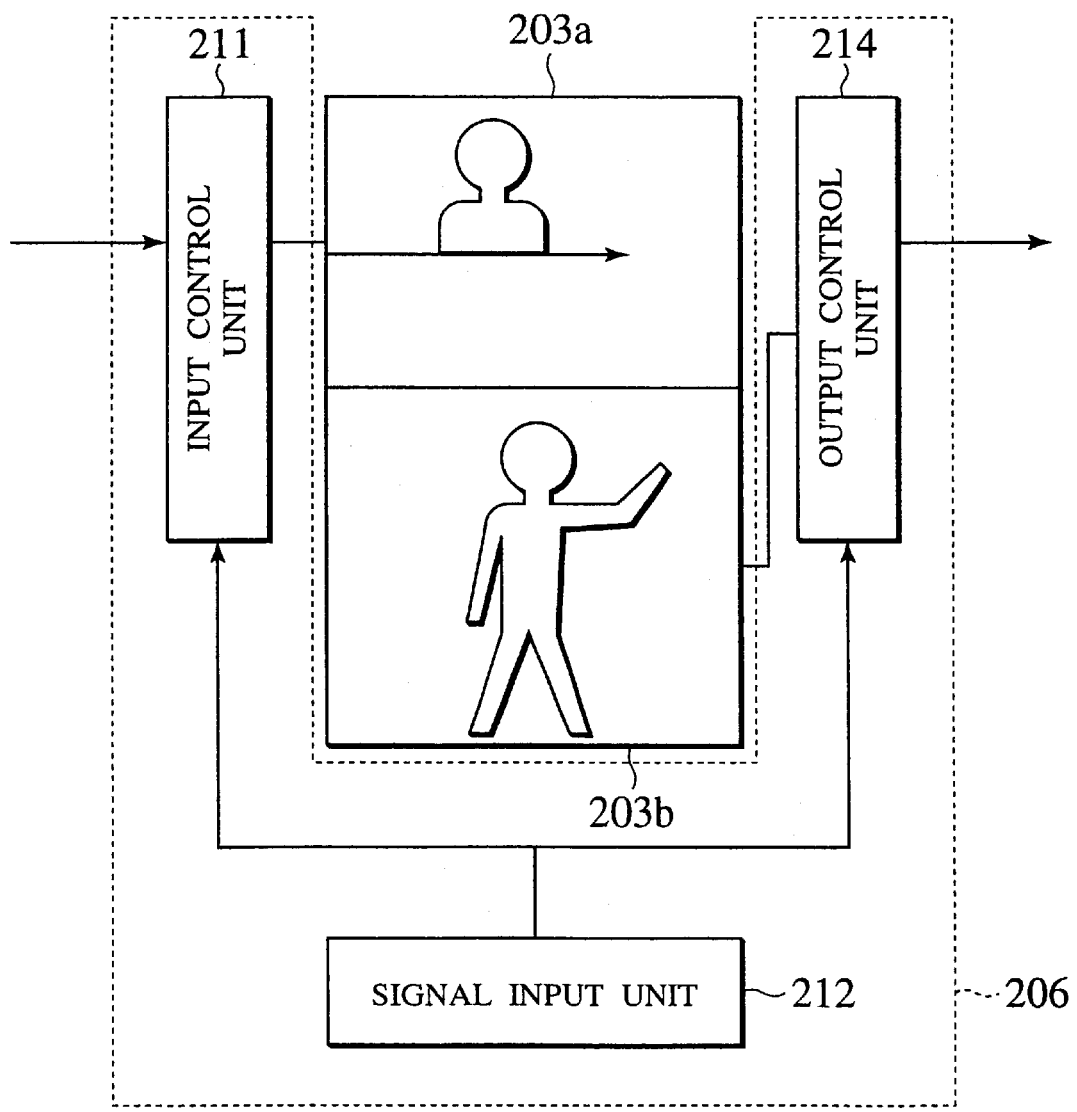
FIG. 3 explains the operation of the second embodiment.

FIG. 3 explains the operation of the second embodiment. The input control unit 211 receives image data from the frame conversion unit 202 (not shown) and stores the image data into, for example, the memory region 203a. The next image data the input control unit 211 receives is stored in the memory region 203b. In this way, the input control unit 211 stores image data in the image regions 203a and 203b alternately. The output control unit 214 reads image data from one of the memory regions 203a and 203b into which the input control unit 211 is not writing image data. If the input control unit 211 is writing image data into the memory region 203a, the output control unit 214 reads image data from the memory region 203b. If the input control unit 211 is writing image data into the memory region 203b, the output control unit 214 reads image data from the memory region 203a.

Upon receiving a memory control signal from the signal input unit 212, the input and output control units 211 and 214 stop the alternating operations mentioned above, so that image data stored in one of the memory regions 203a and 203b is continuously read by the output control unit 214.

Such operations of keeping the same image data in one memory region and continuously outputting the image data gradually improve the quality of a still image formed from the image data. This operation helps reducing power consumption because no alternation is carried out during such operations.

Third Embodiment

Figure 4:
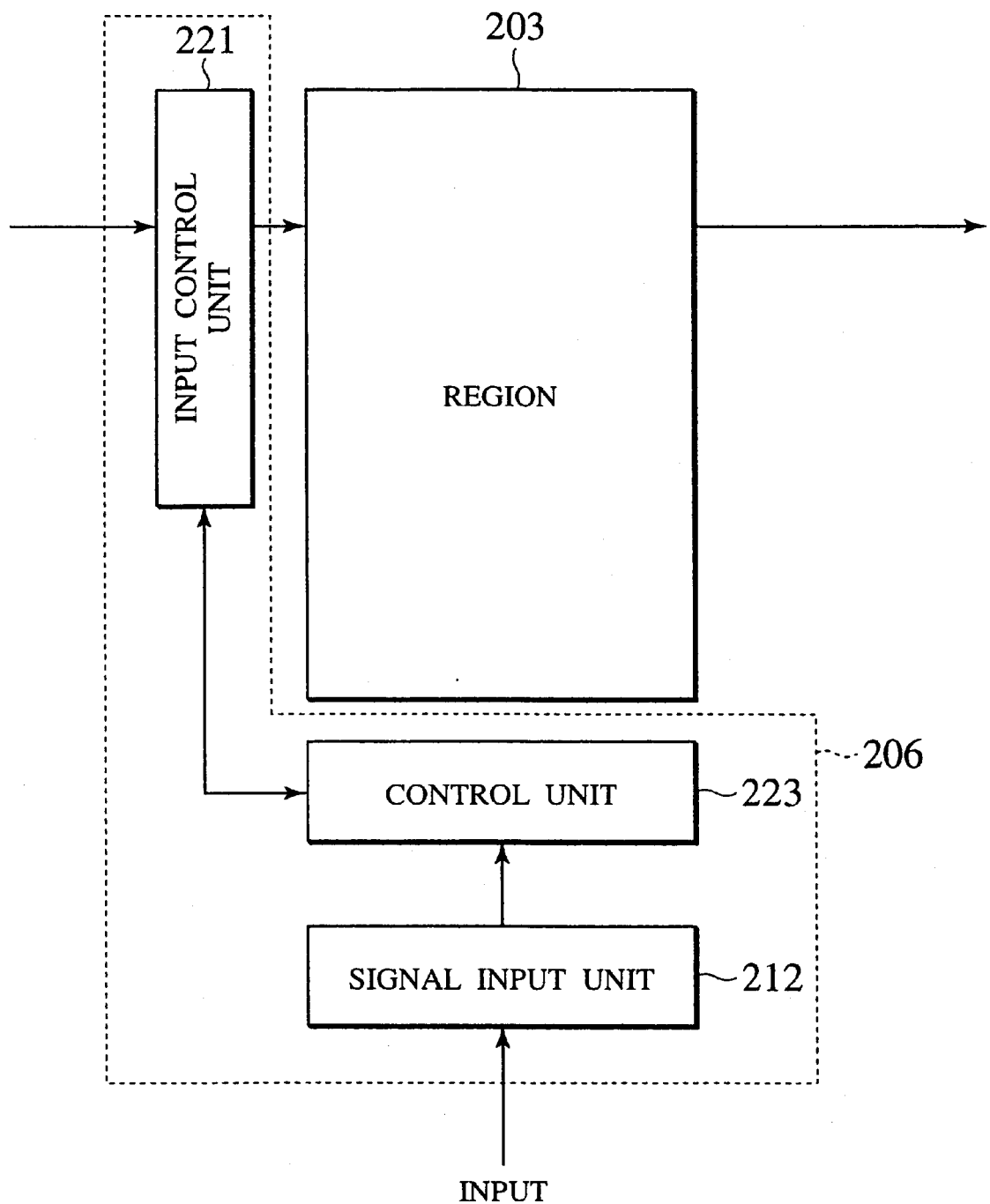
FIG. 4 shows a memory control unit according to a third embodiment of the present invention.

FIG. 4 shows a memory control unit 206 according to the third embodiment of the present invention, applied to the motion pictures sending apparatus of FIG. 1. The memory 203 has one memory region for storing image data. The memory control unit 206 has a signal input unit 212, an input control unit 221, and an update control unit 223. The signal input unit 212 provides a memory control signal in response to an external input signal. The input control unit 221 receives image data from the frame conversion unit 202 (not shown) and stores the image data in the memory 203 in response to an update control signal. The update control unit 223 receives the memory control signal from the signal input unit 212 and provides the update control signal after a frame of image data is stored in the memory 203.

Figure 5:
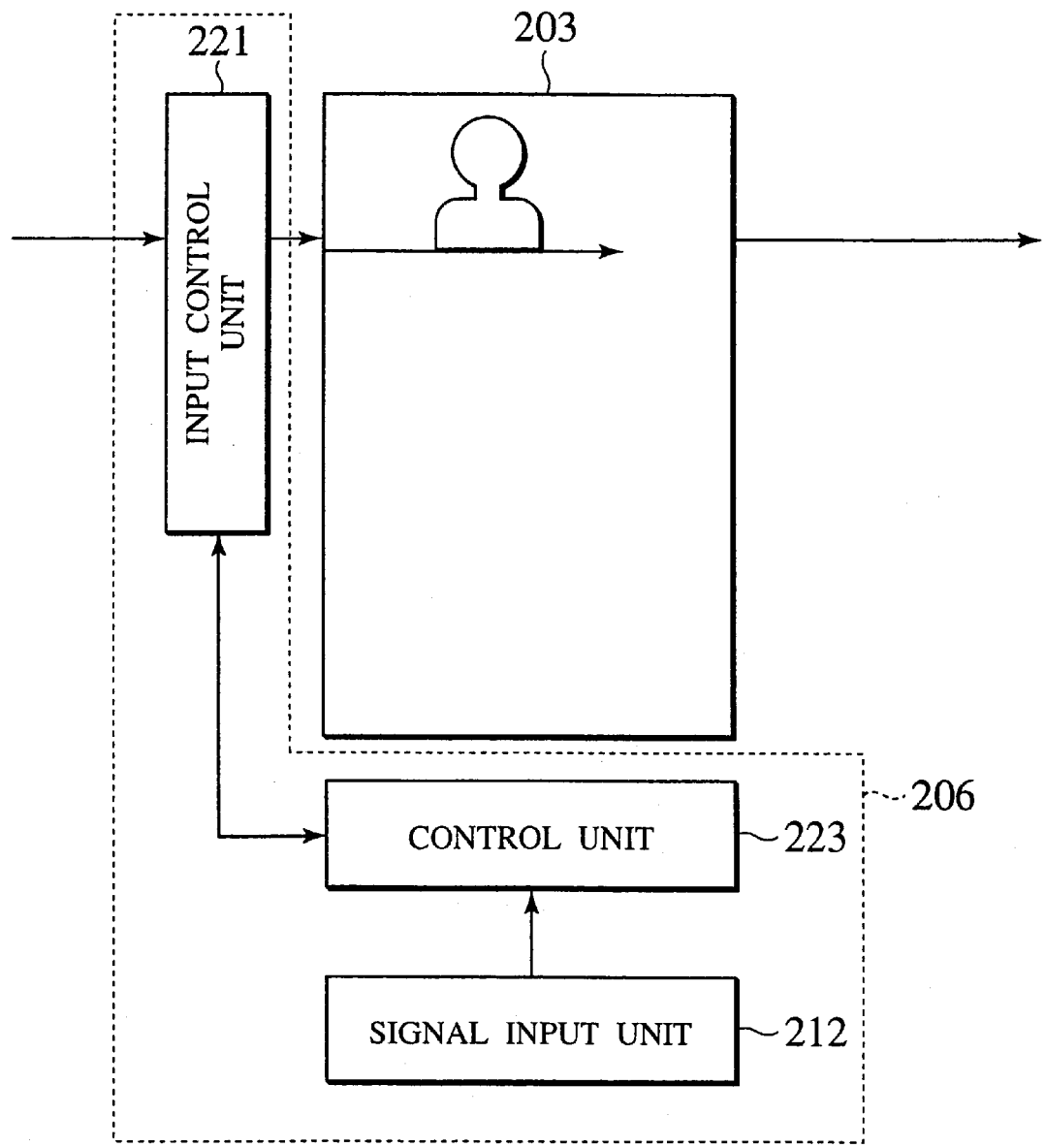
FIG. 5 explains the operation of the third embodiment.

FIG. 5 explains the operation of the third embodiment. The input control unit 221 receives image data from the frame conversion unit 202 (not shown) and writes the image data into the memory 203. The image data in the memory 203 is read out at certain timing.

Upon receiving a memory control signal from the signal input unit 212, the update control unit 223 detects the completion of writing a frame of image data into the memory 203. This detection may be realized by detecting the transfer of an image data pixel having maximum X- and Y-coordinates from the frame conversion unit 202 to the input control unit 221. As soon as a frame of image data is stored in the memory 203, the update control signal is supplied to the input control unit 221, which then stops a write operation to the memory 203. As a result, the memory 203 continuously outputs the same image data.

Namely, the memory 203 keeps the same image data and continuously outputs it, to gradually improve the clarity of a still image formed from the image data. This embodiment involves no alternating operations, thereby reducing power consumption.

Fourth Embodiment

The fourth embodiment of the present invention employs a stop signal output unit 207 in the motion pictures sending apparatus of FIG. 1. In response to a memory control signal from the memory control unit 206, the stop signal output unit 207 provides the camera 100 with a stop signal to stop the operation of the camera 100. Stopping the camera 100 reduces power consumption.

In the second embodiment of FIG. 2, the stop signal for stopping the camera 100 may be the memory control signal from the signal input unit 212 because one of the memory regions 203a and 203b already has image data.

In the third embodiment of FIG. 4, the stop signal for stopping the camera 100 may be the update control signal from the update control unit 223 because the camera 100 can be stopped after a frame of image data is stored in the memory 203.

Fifth Embodiment

The fifth embodiment of the present invention employs a switching unit 208 and a signal generation unit 209 in the motion pictures sending apparatus of FIG. 1. The signal generation unit 209 generates a synchronizing signal including vertical and horizontal synchronizing signals. The switching unit 208 receives the synchronizing signal from the signal generation unit 209 and a synchronizing signal from the camera interface 201 and provides the image processing unit 204 with the synchronizing signal from the camera interface 201 if the camera 100 is operating and the synchronizing signal from the signal generation unit 209 if the camera 100 is not operating.

Figure 6:
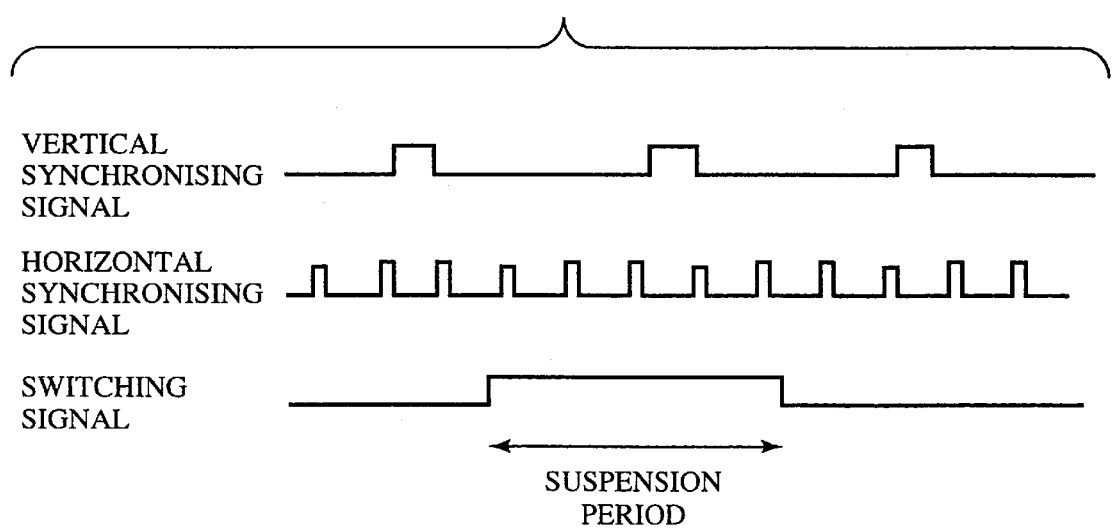
FIG. 6 shows the operations of a signal generation unit and switching unit according to a fifth embodiment of the present invention.

FIG. 6 explains the operations of the switching unit 208 and signal generation unit 209 of the fifth embodiment. If the camera 100 is stopped by a user, the camera interface 201 will stop the generation of the synchronizing signal thereof. Even in such a case, the signal generation unit 209 generates its own synchronizing signal to continue image processes that need the synchronizing signal. In this way, the fifth embodiment continuously provides the synchronizing signal even if the camera 100 is stopped.

Sixth Embodiment

The sixth embodiment of the present invention relates to an operation carried out by the image processing unit 204 of FIG. 1.

FIG. 7 shows the operation of the image processing unit 204 according to the sixth embodiment. In FIG. 7, time elapses from the left to the right of a time axis. An I-picture is an independent picture that is prepared without previous or next frame information. A P-picture is a picture that is prepared according to differential information with respect to an I-picture or a P-picture.

During a suspension period in which the updating of image data is stopped, the image processing unit 204 sends no I-picture and sends only P-pictures involving frame-to-frame compression. In this case, the image processing unit 204 may send B-pictures, which involve frame-to-frame compression like the P-pictures.

When image data in the memory 203 is fixed to gradually improve image quality, it is preferable to send only frame-to-frame compressed images such as P-pictures. If an I-picture compressed within a frame is inserted, image quality will be initialized to an unclear state, which must be avoided.

Seventh Embodiment

The seventh embodiment of the present invention relates to another operation carried out by the image processing unit 204 of FIG. 1.

FIG. 8 shows the operation of the image processing unit 204 according to the seventh embodiment. In FIG. 8., time elapses from the left to the right of a time axis. As soon as a suspension period during which image data in the memory 203 is fixed ends, the image processing unit 204 sends an I-picture.

In one usage, a subscriber may be presented with an image and prompted to acknowledge the image. A suspension period for this operation before resuming the updating of image data in the memory 203 is quite longer than a frame interval, and therefore, images before and after the suspension period will greatly differ from each other. Accordingly, initializing an image by sending an I-picture compressed within a frame without motion compensation is appropriate just after such suspension period in reducing power consumption and shortening a processing time.

Eighth Embodiment

FIG. 9 shows a motion pictures sending apparatus according to the eighth embodiment of the present invention. This embodiment differs from the embodiment of FIG. 1 in that it employs an external memory 231. The memory 231 is removable so that it may be replaced with another having different capacity. This structure provides the apparatus with flexibility. A part 200 of FIG. 1 may be prepared as an IC (integrated circuit). Similarly, a part 200 of FIG. 9 may be prepared as an IC. The external memory 231 may be prepared as an IC.

Ninth Embodiment

FIG. 10 shows a motion pictures communication apparatus having a sending control unit 200 that may be the part 200 of any one of FIGS. 1 and 9. The apparatus has a camera 100 for picking up motion pictures, the sending control unit 200 for processing and sending the motion pictures from the camera 100, an output interface 300 for communicating data with an external network 400, an input interface 500 for receiving data from the network 400, a receiving control unit 600 for processing the received data, and a display 700 for displaying the processed data. The sending control unit 200 may be based on any one of the first to eighth embodiments. The apparatus of FIG. 10 realizes bidirectional communication.

As explained above, the present invention is capable of sending and receiving clear images with a simple arrangement.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A motion pictures sending apparatus comprising:
   a camera interface configured to receive an image signal from a camera;

a frame conversion unit configured to carry out coordinates conversion on the received image signal and generate image data;

a memory configured to store the image data;

an image processing unit configured to process the image data from the memory and providing processed data;

an output interface configured to transfer the processed data to a communication interface unit;

a memory control unit configured to stop the updating of image data to the memory in response to an input signal, a signal generation unit configured to generate a synchronizing signal; and a switching unit configured to receive the synchronizing signal from the signal generation unit and a synchronizing signal from the camera interface and provide the image processing unit with the synchronizing signal from the camera interface if the camera is operating and the synchronizing signal from the signal generation unit if the camera is not operating.

2. The apparatus claimed in claim 1, wherein the memory comprises:

a first region configured to store image data; and a second region configured to store image data.

3. The apparatus claimed in claim 2, wherein the memory control unit comprises:

a signal input unit configured to provide a memory control signal in response to an input signal;

an input control unit configured to receive image data from the frame conversion unit and store the image data in the first and second regions alternately; and an output control unit configured to read image data out of the first and second regions alternately, wherein the input control unit and output control unit is configured to stop the alternate operations upon receiving the memory control signal.

4. The apparatus as claimed in claim 1, further comprising:

a stop signal output unit configured to issue a stop signal to the camera upon receiving the memory control signal from the memory control unit.

5. The apparatus as claimed in claim 1, wherein the image processing unit compresses the image data from the memory and provide compressed data.

6. A motion pictures sending apparatus comprising:

a camera interface configured to receive an image signal from a camera;

a frame conversion unit configured to carry out coordinates conversion on the received image signal and generate image data;

a memory configured to store the image data;

an image processing unit configured to process the image data from the memory and providing processed data;

an output interface configured to transfer the processed data to a communication interface unit; and a memory control unit configured to stop the updating of image data to the memory in response to an input signal, wherein the memory control unit comprises:

a signal input unit configured to provide a memory control signal in response to an input signal, an input control unit configured to receive image data from the frame conversion unit and store the image data in memory in response to an update control signal, and an update control unit configured to provide the update control signal in response to the memory control signal and after a frame of image data is stored in the memory, the update control unit configured to generate update control signal based on pixel information of the image data from the frame conversion unit, wherein the input control unit stopping image data is configured to stop the memory upon receiving the update control signal.

7. The apparatus as claimed in claim 6, further comprising:

a stop signal output unit configured to issue a stop signal to the camera upon receiving the memory control signal from the memory control unit.

8. The apparatus as claimed in claim 6, wherein the image processing unit compresses the image data from the memory and provide compressed data.

9. The apparatus as claimed in claim 6, wherein the image processing unit compresses the image data using forward prediction and provides compressed data.

10. The apparatus as claimed in claim 9, wherein the image processing unit does not provide a picture which is prepared without previous or next frame information during a suspension period in which no image data is updated.

11. The apparatus as claimed in claim 9, wherein the image processing unit provides a picture which is prepared without previous or next frame information as soon as the updating of image data is resumed.

12. The apparatus as claimed in claim 9, wherein the image processing unit compresses the image data based on the MPEG 4 or H.263.

13. The apparatus as claimed in claim 12, wherein the image processing unit provides no I-picture which is prepared without previous or next frame information during a suspension period in which no image data is updated.

14. The apparatus as claimed in claim 12, wherein the image processing unit provides an I-picture which is prepared without previous or next frame information as soon as the updating of image data is resumed.

15. A motion pictures sending apparatus comprising:

a camera interface configured to receive an image signal from a camera;

a frame conversion unit configured to carry out coordinates conversion on the received image signal and generating image data;

an image processing unit configured to process the image data and providing processed data;

an output interface configured to transfer the processed data to a communication interface unit;

a memory control unit configured to stop the updating of image data to a memory in response to an input signal, a signal generation unit configured to generate a synchronizing signal; and a switching unit configured to receive the synchronizing signal from the signal generation unit and a synchronizing signal from the camera interface and provide the image processing unit with the synchronizing signal from the camera interface if the camera is operating and the synchronizing signal from the signal generation unit if the camera is not operating, wherein the data is stored by a memory which is external to the motion pictures sending apparatus.

16. A motion pictures communication apparatus comprising:

a camera configured to pick up motion pictures;

a sending control unit configured to process and send the motion pictures;

an output interface configured to communicate data with a network;

an input interface configured to receive data from the network;

a receiving control unit configured to process the received data;

a display configured to display the processed data;

wherein the sending control unit has comprises:

a camera interface configured to receive an image signal from the camera;

a frame conversion unit configured to carry out coordinates conversion on the received image signal and generate image data;

a memory configured to store the image data;

an image processing unit configured to process the image data from the memory and provide processed data;

an output interface configured to transfer the processed data to a communication interface unit;

a memory control unit configured to stop the updating of image data to the memory in response to an input signal;

a signal generation unit configured to generate a synchronizing signal; and a switching unit configured to receive the synchronizing signal from the signal generation unit and a synchronizing signal from the camera interface and provide the image processing unit with the synchronizing signal from the camera interface if the camera is operating and the synchronizing signal from the signal generation unit if the camera is not operating.

17. A motion pictures communication apparatus comprising:

a camera configured to pick up motion pictures;

a sending control unit configured to process and send the motion pictures;

an output interface configured to communicate data with a network;

an input interface configured to receive data from the network;

a receiving control unit configured to process the received data; and a display configured to display the processed data, wherein the sending control unit has comprises:

a camera interface configured to receive an image signal from the camera;

a frame conversion unit configured to carry out coordinates conversion on the received image signal and generate image data;

an image processing unit configured to process the image data and provide the processed data;

an output interface configured to transfer the processed data to a communication interface unit; and a memory control unit configured to stop the updating of image data to a memory in response to an input signal, a signal generation unit configured to generate a synchronizing signal; and a switching unit configured to receive the synchronizing signal from the signal generation unit and a synchronizing signal from the camera interface and provide the image processing unit with the synchronizing signal from the camera interface if the camera is operating and the synchronizing signal from the signal generation unit if the camera is not operating, wherein the data is stored by a memory which is external to the motion pictures sending communication apparatus.

* * * * *